Nov. 6, 1928.
H. B. LONG
SCHEDULE CHECKING APPARATUS
Filed Aug. 27, 1927
1,690,738
2 Sheets-Sheet 2
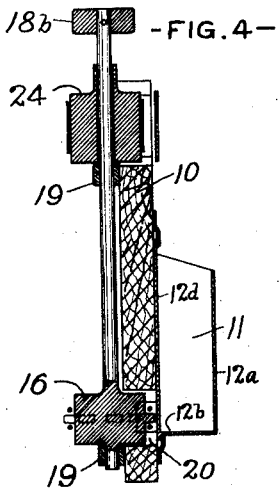
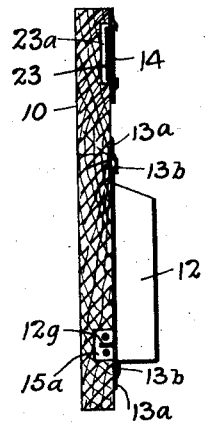
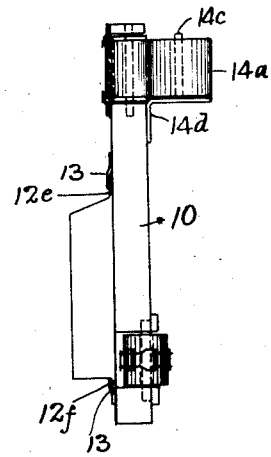
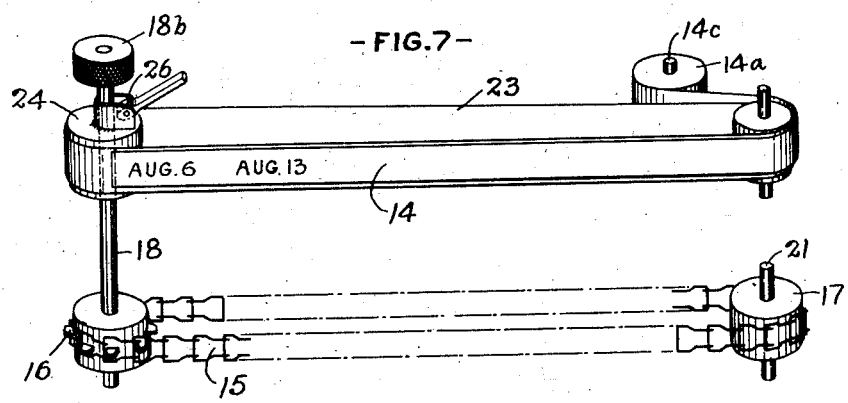
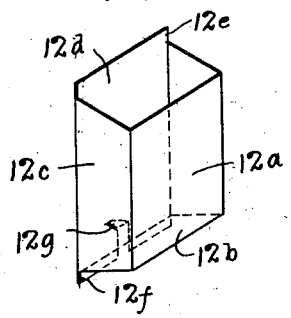
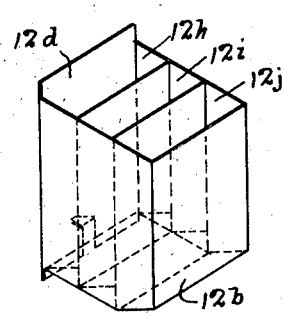
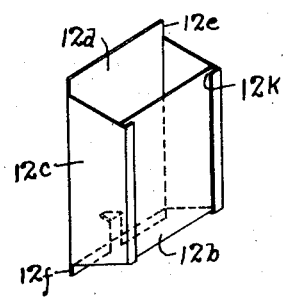
WITNESSES
INVENTOR Patented Nov. 6, 1928.

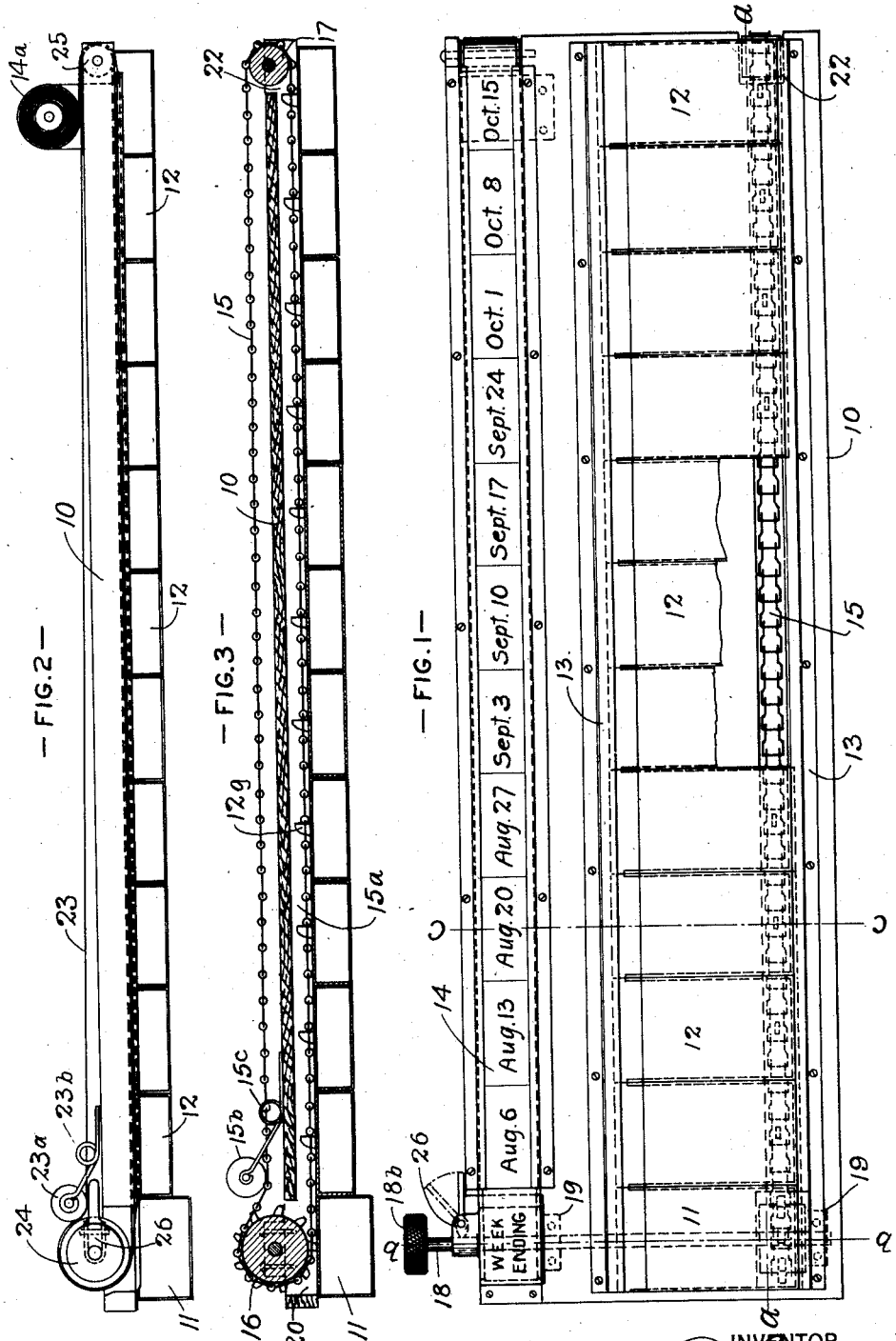

1,690,738

UNITED STATES PATENT OFFICE.

HARRY B. LONG, OF PATERSON, NEW JERSEY.

SCHEDULE-CHECKING APPARATUS.

Application filed August 27, 1927. Serial No. 215,771.

This invention relates to apparatuses for keeping check on the status of business operations, such as work on orders in manufacturing plants, filling orders in mercantile establishments, cargoing vessels and freight carrying vehicles, answering inquiries, supplying specifications, quotations, or estimates, and for other similar operations which require constant attention, to the end that delays productive of much inconvenience and pecuniary loss may be avoided.

The invention has for an object, to provide an apparatus of such character, which is of simple, durable, compact and inexpensive construction, which can be conveniently and economically operated, and which will afford an accurate check on the operations in connection with which it is employed.

The improvement claimed is hereinafter fully set forth.

In the accompanying drawings: Figure 1 is a front view, in elevation, with a central portion broken away, of a schedule checking apparatus embodying the invention; Fig. 2, a top plan view thereof; Fig. 3, a longitudinal transverse section, taken on the line a—a of Fig. 1; Figs. 4 and 5, vertical transverse sections, taken, respectively, on the lines b—b and c—c of Fig. 1; Fig. 6, an end view, in elevation, taken from the right hand end of Fig. 1; Fig. 7, a diagrammatic view, showing the mechanism for advancing the indicating tape and the pending order boxes; Fig. 8, a perspective view of one of the pending order boxes; and Figs. 9 and 10, similar views, each illustrating a different structurally modified form of pending order box.

It is well known that, in manufacturing establishments and commercial concerns, where orders and the like are turned over to subordinates for attention, the executives, general managers, supervisors, foremen, and other interested parties, must keep themselves constantly and thoroughly informed regarding the status of the work, and, most especially, must be immediately advised when any work has reached its due date uncompleted. The failure to have such information promptly called to their attention, oftentimes entails serious inconvenience and large pecuniary losses. The present invention is designed to provide means which will afford an accurate check on the progress of operations, and positively call attention to any work which has reached its due date uncompleted. While the invention will be described as applied to checking work order cards, in a manufacturing plant, it is to be understood that it is equally applicable for use in connection with a widely varied range of business operations.

In the practice of the invention, referring descriptively to the specific embodiment thereof which is herein exemplified, the improved schedule checking apparatus comprises a main support, 10, which is shown as a flat board, having the following approximate dimensions, viz length, 4 ft., height, 1 ft.; thickness, 1 inch. It is to be understood, however, that any suitable form of support may be employed in place of the flat board.

By referring to Fig. 1, of the drawings, it will be seen that the support, 10, carries a horizontally disposed row of boxes for holding work order cards. One of these boxes, 11, is fixed adjacently to the support, and to it are transferred cards for orders which have reached their due dates uncompleted. This box will be designated the "overdue order box." The remainder of the boxes, 12, are mounted in guideways, 13, for movement along the board toward the overdue order box, and are intended to carry order cards for work in the course of completion. These boxes will be designated "pending order boxes". Each of the pending order boxes is adapted to be individually removed from the guideways when it reaches the position at one end of the row, next to the overdue order box, and to be replaced on the guideways at the opposite end of the row.

A strip of tape, 14, for indicating the due dates of orders, is disposed along the support, above and parallel with the row of pending order boxes. Each date, on the tape, indicates the month and the day of the month, and the respective dates of the series progress by weekly intervals, and are separated from each other by blank spaces of uniform length.

In order to give a comprehensive understanding of the invention, a general description of its more important purposes, and one method of operation, will first be given, reserving until later in this specification, a detailed description of one of the preferred forms of mechanism for advancing the indicating tape and the pending order boxes. In the use of the apparatus in a manufacturing plant, the operator whose duty it is to keep track of orders in the course of completion, will file the incoming order cards in the respective pending order boxes, according to their due dates. For example, cards for orders due Sept. 3rd, will be deposited in the box over which appears on the tape the date Sept. 3rd. Similarly, cards for orders due Oct. 15th, will be deposited in the box over which appears the due date Oct. 15th, and so on. Whenever an order is completed, the operator will withdraw the order card therefor, from the box in which it is filed. Assuming for the purpose of illustration, that the date is August 6th, at the close of the business day, the operator will look in the pending order box disposed beneath that date on the tape, and remove therefrom any order cards remaining. Such cards will be for orders which have reached their due dates uncompleted. These cards he will transfer to the stationary or overdue order box, 11, to be immediately called to the attention of the proper superior as representing overdue orders. He next removes the pending order box below the date Aug. 6th on the tape, and then advances the tape and the remainder of the pending order boxes, 12, so as to bring the date, Aug. 13th, on the tape, and the box thereunder, immediately next to the overdue order box, 11, returning the pending order box removed, to the guideways, at the opposite end of the row. When Aug. 13th arrives, a similar operation is performed.

It is to be understood that, from time to time, the operator can inspect the various boxes to determine instances where an unusual number of orders are nearing their due dates uncompleted, and take such action as may be necessary to expedite their completion, thus avoiding the difficulties incident to having a large number of orders reach their due dates uncompleted.

An endless sprocket chain, 15, is employed for advancing the pending order boxes, the links of which are disposed vertically. One reach of the chain fits in a horizontal groove, 15$^a$, cut in the front face of the support, 10. The chain runs over a sprocket wheel, 16, and a pulley, 17, one disposed at each end of the support. The sprocket wheel, 16, is mounted on a vertical shaft, 18, fitted in brackets, 19, secured to the support by screws. A suitable opening, 20, is cut in the support, to receive the sprocket wheel. The pulley, 17, is mounted on a spindle, 21, secured in a notch, 22, cut in one end of the support. A take-up roller, 15$^b$, normally urged toward the chain by a spring, 15$^c$, is provided to give the proper tension to the chain.

An endless belt, 23, is employed for advancing the due date indicating tape, 14. One reach of the belt fits in a horizontal groove, 23$^a$, cut in the front face of the support. The belt runs over pulleys, 24 and 25, one disposed at each end of the support. The pulley, 24, is mounted on the vertical shaft, 18, and is normally locked thereto, for rotation with the sprocket wheel, by a releasable clutch, 26. When the clutch is released, the pulley, 24, can be rotated independently of the sprocket wheel, to effect suitable adjustment of the date indicating tape with relation to the pending order boxes.

A take-up roller, 23$^a$, normally urged toward the belt by a spring, 23$^b$, is provided to give the proper tension to the belt.

The indicating tape, 14, is fed from a roll, 14$^a$, mounted on a spindle, 14$^c$, fastened in the bracket, 14$^d$.

The upper end of the shaft, 18, is provided with a knurled knob, 18$^b$, adapted to be turned by the fingers, to effect simultaneous movement, at the same rate of speed, of the pending order boxes and the tape.

The guideways, 13, are in the form of long metal strips, each strip comprising a flat portion, 13$^a$, adapted to be fastened to the support by screws, and an offset portion, 13$^b$, which is spaced from the support to provide a groove for the reception of a retaining flange formed on the pending order boxes.

Each pending order box, 12, comprises a front wall, 12$^a$, a bottom wall, 12$^b$, two side walls, 12$^c$, and a rear wall, 12$^d$. The rear wall projects above and below the side walls, to provide the retaining flanges 12$^e$, and 12$^f$, adapted to fit in the grooves in the guideways.

A horizontal projection or tongue, 12$^g$, adapted to fit in the openings in the links of the chain, is provided near the bottom of the rear wall, 12$^d$, of each of the pending order boxes. This tongue is formed by cutting two spaced vertical slits at the bottom of the rear wall of the box, and bending up the metal disposed therebetween.

In Fig. 9 of the drawings there is shown a modified form of pending order card box, comprising three compartments, 12$^h$, 12$^i$ and 12$^j$.

In Fig. 10 of the drawings there is shown a further modified form of pending order card box, comprising one compartment, and guides, 12$^k$, for retaining a card at the front of the box.

It is within the contemplation of the invention to employ in place of the boxes, 12, any suitable form of rack, or card holding device.

The date indicating tape may be attached to the belt by gluing one end thereto, or it may be secured by stitching or any other suitable form of fastener.

The invention claimed, and which it is desired to secure by Letters Patent, is:

1. In a schedule checking apparatus, the combination of a stationary holder for schedule cards; a support; a row of holders for schedule cards, movably and removably mounted on the support; and means for guiding the movable holders along the support toward the stationary holder.

2. In a schedule checking apparatus, the combination of, a support; a holder for schedule cards stationarily mounted on the support; a row of holders for schedule cards, movably mounted on the support; data indicating means, movable along the support, and juxtaposing to each of the movable holders, data appertaining thereto; and means for moving the row of movable holders along the support, toward the stationary holder.

3. In a schedule checking apparatus, the combination of a support; a holder for schedule cards, stationarily mounted on the support; a row of holders for schedule cards, movably and removably mounted on the support; and means for moving the row of movable holders along the support, toward the stationary holder.

4. In a schedule checking apparatus, the combination of a support; a holder for schedule cards, stationarily mounted on the support; a row of holders for schedule cards, movably mounted on the support; data indicating means, movable along the support, and juxtaposing to each of the movable holders, data appertaining thereto; means for moving the data indicating means along the support; and means for moving the row of movable holders along the support, toward the stationary holder.

5. In a schedule checking apparatus, the combination of a support; a holder for schedule cards, stationarily mounted on the support; a row of holders for schedule cards, movably mounted on the support; data indicating means, movable along the support, and juxtaposing to each of the movable holders, data appertaining thereto; means for moving the data indicating means along the support, toward the stationary holder; means for moving the row of movable holders along the support, toward the stationary holder; and means for causing the data indicating means, and the row of movable holders, to simultaneously traverse the support, toward the stationary holder, at the same rate of speed.

6. In a schedule checking apparatus, the combination of a support; a stationary holder for schedule cards, mounted on the support; a row of holders for schedule cards, movably mounted on the support; an endless band for moving the movable holders along the support, toward the stationary holder; a roll of tape, mounted on the support, and marked with data throughout its length, the markings being spaced apart by blank intervals of uniform length; a stretch of tape, led from said roll, and extending along the support and juxtaposing to each of the movable holders, a data marking appertaining thereto; and an endless band for advancing the stretch of tape along the support, toward the stationary holder.

7. In a schedule checking apparatus, the combination of a support; a stationary holder for schedule cards, mounted on the support; a row of holders for schedule cards, mounted on the support; an endless band for moving the movable holders along the support, toward the stationary holder; a roll of tape mounted on the support, and marked with data throughout its length, the markings being spaced apart by blank intervals, of uniform length; a stretch of tape, led from said roll, and extending along the support and juxtaposing to each of the movable holders, a data marking appertaining thereto; an endless band for advancing the stretch of tape along the support, toward the stationary holder; and means for simultaneously advancing the two endless bands at the same rates of speed.

8. In a schedule checking apparatus, the combination of a support; a stationary box for schedule cards, mounted on the support; a pair of spaced, parallel guides, extending longitudinally across the support to the stationary box; a row of boxes for schedule cards, movably mounted in the guides, each of the boxes having an extension at its rear for engaging a sprocket chain, and a top flange and a bottom flange, each flange engaging one of the guides; an endless sprocket chain for advancing the movable boxes along the guides; a vertical shaft mounted on the support; a sprocket wheel mounted on the shaft, for driving the chain; a roll of tape mounted on the support, and marked with data throughout its length, the markings being spaced apart by blank intervals of uniform length; a stretch of tape, led from said roll, and extending along the support, and juxtaposing to each of the movable holders, a data marking appertaining thereto; an endless belt for advancing the stretch of tape, along the support, toward the stationary box; a pulley mounted on the vertical shaft, for driving the belt; a clutch for releasably locking the pulley to the shaft; and means, mounted on the shaft, to enable it to be rotated by hand.

HARRY B. LONG.